United States Patent
Dong

(10) Patent No.: US 11,896,895 B2
(45) Date of Patent: Feb. 13, 2024

(54) ROTATIONAL ASSEMBLY AND HANDLE HAVING ROTATIONAL ASSEMBLY

(71) Applicant: GOERTEK INC., Shandong (CN)

(72) Inventor: Changhua Dong, Shandong (CN)

(73) Assignee: GOERTEK, INC., Shandong (CN)

( * ) Notice: Subject to any disclaimer, the term of this patent is extended or adjusted under 35 U.S.C. 154(b) by 0 days.

(21) Appl. No.: 18/040,843

(22) PCT Filed: Nov. 27, 2020

(86) PCT No.: PCT/CN2020/132220
§ 371 (c)(1),
(2) Date: Jun. 7, 2023

(87) PCT Pub. No.: WO2022/041531
PCT Pub. Date: Mar. 3, 2022

(65) Prior Publication Data
US 2023/0293981 A1  Sep. 21, 2023

(30) Foreign Application Priority Data

Aug. 28, 2020 (CN) .......................... 202010886308.6

(51) Int. Cl.
*A63F 13/24* (2014.01)
*A63F 13/92* (2014.01)
*A63F 13/26* (2014.01)

(52) U.S. Cl.
CPC .............. *A63F 13/24* (2014.09); *A63F 13/26* (2014.09); *A63F 13/92* (2014.09);
(Continued)

(58) Field of Classification Search
CPC .......... A63F 13/24; A63F 13/26; A63F 13/92; A63F 2300/1043; A63F 2300/301;
(Continued)

(56) References Cited

U.S. PATENT DOCUMENTS 5,781,180 A * 7/1998 Couch .................... A63F 13/428
345/161
6,862,779 B1 * 3/2005 Lu ....................... H04M 1/0216
16/337

(Continued)

FOREIGN PATENT DOCUMENTS

CN        2585674 Y    11/2003
CN      201551831 U     8/2010
(Continued)

*Primary Examiner* — Dmitry Suhol
*Assistant Examiner* — Carl V Larsen
(74) *Attorney, Agent, or Firm* — LKGlobal | Lorenz & Kopf, LLP

(57) ABSTRACT

A rotating assembly comprises a rotary shaft, an accommodating body and a position-limiting switch. An outer wall of the rotary shaft includes a first tenon and a second tenon. The accommodating body includes a matching hole for the first tenon to insert and rotate therein. An inner wall of the matching hole includes a convex rib. By rotating the rotary shaft, a side wall of the first tenon and a side wall of the convex rib butt against or separate from each other, so that in an axial direction of the rotary shaft, the rotary shaft is fixed or movable relative to the accommodating body. When the side wall of the first tenon and the side wall of the convex rib butt against each other, the position-limiting switch and the second tenon are clamped together to prevent the rotary shaft from rotating relative to the accommodating body.

20 Claims, 10 Drawing Sheets

(52) U.S. Cl.
CPC . *A63F 2300/1043* (2013.01); *A63F 2300/301* (2013.01); *E05Y 2900/606* (2013.01)

(58) Field of Classification Search
CPC .... G06F 1/1681; G06F 1/1624; G06F 1/1626; G06F 1/1679; E05Y 2900/606
See application file for complete search history.

(56) References Cited

U.S. PATENT DOCUMENTS

| | | | |
|---|---|---|---|
| 10,705,571 B1* | 7/2020 | Chen | E05D 11/1007 |
| 2005/0177979 A1* | 8/2005 | Duan | G06F 1/1681 |
| | | | 16/337 |
| 2006/0281550 A1 | 12/2006 | Schena | |
| 2007/0094845 A1* | 5/2007 | Chang | G06F 1/1681 |
| | | | 16/342 |
| 2007/0169312 A1* | 7/2007 | Ho | G06F 1/1679 |
| | | | 16/330 |
| 2008/0078056 A1* | 4/2008 | Hsu | H04M 1/0222 |
| | | | 16/280 |
| 2010/0048308 A1* | 2/2010 | Lee | A63F 13/245 |
| | | | 463/47 |
| 2010/0061049 A1* | 3/2010 | Shen | G06F 1/1681 |
| | | | 361/679.21 |
| 2010/0095482 A1* | 4/2010 | Shen | G06F 1/1681 |
| | | | 16/386 |
| 2011/0252601 A1* | 10/2011 | Lin | G06F 1/1681 |
| | | | 16/280 |
| 2013/0099541 A1* | 4/2013 | Hung | A47C 9/002 |
| | | | 297/344.21 |
| 2014/0364232 A1* | 12/2014 | Cramer | A63F 13/98 |
| | | | 463/37 |
| 2020/0269130 A1* | 8/2020 | Provancher | A63F 13/24 |

FOREIGN PATENT DOCUMENTS

| | | |
|---|---|---|
| CN | 206214741 U | 6/2017 |
| CN | 109224433 A | 1/2019 |
| CN | 111957033 A | 11/2020 |

* cited by examiner

ROTATIONAL ASSEMBLY AND HANDLE HAVING ROTATIONAL ASSEMBLY

CROSS-REFERENCE TO RELATED APPLICATIONS

This Application is a U.S. National-Stage entry under 35 U.S.C. § 371 based on International Application No. PCT/CN2020/132220, filed Nov. 27, 2020 which was published under PCT Article 21(2) and which claims priority to Chinese Application No. 202010886308.6, filed Aug. 28, 2020, which are all hereby incorporated herein in their entirety by reference.

TECHNICAL FIELD

This application pertains to the technical field of a handle, in particular to a rotating assembly and a handle having the same.

BACKGROUND

At present, as handles are more widely used in games, people have more expectations for the functions of the handles.

In the prior art, the handle usually comprises two gripping portions to be held by the left and right hands respectively. The two gripping portions may be connected through a body portion. The body portion and the two gripping portions may be provided with control keys. During the operation, the left and right hands should touch the control keys while holding different gripping portions respectively to achieve corresponding functions.

The body portion and the two gripping portions are often fixedly connected, which makes the handle structure relatively monotonous. When it needs to operate the handle for entertainment, the handle needs to be connected to a display screen, which creates requirements for the operation occasions. For example, the user can only use the handle in the environment where there is a display screen, and the user needs to face the screen, so that the occasions where the handle can be used are greatly limited.

In sum, it is a technical problem for those skilled in the art to provide a handle that can break through the limited occasions where the handle can be used. In addition, other objects, desirable features and characteristics will become apparent from the subsequent summary and detailed description, and the appended claims, taken in conjunction with the accompanying drawings and this background.

SUMMARY

An object of the present disclosure is to provide a rotating assembly and a handle having the same. A body portion of the handle may be flipped relative to two gripping portions, so that the handle can be used in various occasions.

To achieve the object, the present disclosure provides a rotating assembly, which comprises: a rotary shaft, an accommodating body and a position-limiting switch, wherein an outer wall of the rotary shaft is provided with a first tenon and a second tenon;
the accommodating body is provided with a matching hole for the first tenon to insert and rotate therein, an inner wall of the matching hole is provided with a convex rib, and by rotating the rotary shaft, a side wall of the first tenon and a side wall of the convex rib butt against or separate from each other, so that in an axial direction of the rotary shaft, the rotary shaft is fixed or movable relative to the accommodating body;
when the side wall of the first tenon and the side wall of the convex rib butt against each other, the position-limiting switch and the second tenon are clamped together to prevent the rotary shaft from rotating relative to the accommodating body.

Optionally, the inner wall of the matching hole is also provided with a positioning rib, the positioning rib and the convex rib are spaced from each other in a circumferential direction of the matching hole, and a width of the positioning rib along the axial direction of the matching hole is greater than a width of the convex rib along the axial direction of the matching hole;

when the first tenon is rotated to a position between the positioning rib and the convex rib, an end face of the positioning rib butt against an end face of the first tenon, and the end face of the positioning rib and the end face of the first tenon are separated from each other by controlling the first tenon to move along the axis direction of the rotary shaft and in a direction of approaching the position-limiting switch.

Optionally, the matching hole is provided thereon with a plurality of the convex ribs that are spaced at intervals in an axial direction of the matching hole, the rotary shaft is provided thereon with a plurality of the first tenons in the axial direction of the rotary shaft, a quantity of the first tenons is the same as a quantity of the convex ribs, and all the first tenons are used to simultaneously butt against or separate from different convex ribs.

Optionally, the inner wall of the matching hole is also provided with a connecting rib, the connecting rib is connected with the positioning rib, two ends of the convex rib are respectively spaced from ends of the connecting rib and the positioning rib, a width of the connecting rib along the axial direction of the matching hole is equal to a width of the convex rib along the axial direction of the matching hole, and two first tenons are provided in a same circumferential direction of the rotary shaft;

when the side wall of one of the first tenons butts against the side wall of the convex rib, the side wall of the other of the first tenons butts against the side wall of the connecting rib, and the position-limiting switch and the second tenon are clamped together;
when the position-limiting switch is separated from the second tenon, and the rotary shaft rotates to a position where an end face of one of the first tenon and an end face of the positioning rib butt against each other, the other of the first tenons is located between the connecting rib and the convex rib.

Optionally, the position-limiting switch can be close to or far away from the second tenon in a radial direction of the rotary shaft to achieve the clamping to and loosening from the second tenon.

Optionally, the position-limiting switch comprises a clamping arm, which has a clamping opening for clamping the second tenon and clamping a side wall of the rotary shaft.

Optionally, the rotating assembly further comprises an elastic member butting against the position-limiting switch, so that the position-limiting switch is subjected to a preload force for moving in a direction of approaching the second tenon.

The present disclosure also provides a handle, which comprises two gripping portions and a body portion located between the two gripping portions, wherein the handle further comprises the rotating assembly according to any one of the above aspects; and one of the body portion and the gripping portion is provided with the rotary shaft, and the other of the body portion and the gripping portion is provided with the accommodating body and the position-limiting switch.

Optionally, two sides of the body portion are respectively provided with a control key and a screen.

Optionally, the position-limiting switch is provided with a contact, each of the two gripping portions is provided with the rotary shaft, and the body portion is provided with a position-limiting hole for the contact to extend out and move therein, and the position-limiting switch and the second tenon are separated from each other by touching the contact to control the contact to move in a direction away from the rotary shaft.

With respect to the prior art as stated above, the rotating assembly according to an embodiment of the present disclosure comprises a rotary shaft, an accommodating body and a position-limiting switch. The outer wall of the rotary shaft is provided with a first tenon and a second tenon. The accommodating body is provided with a matching hole, the first tenon of the rotary shaft can be inserted into the matching hole, and the first tenon can rotate in the matching hole. The inner wall of the matching hole is provided with a convex rib, and when the rotary shaft rotates in the matching hole, the side wall of the first tenon can butt against or separate from the side wall of the convex rib, so that the rotary shaft is fixed or movable relative to the accommodating body in the axial direction of the rotary shaft. When the side wall of the first tenon and the side wall of the convex rib butt against each other, the position-limiting switch and the second tenon are clamped together, so that the rotary shaft is fixed by the position-limiting switch to prevent the rotary shaft from rotating relative to the accommodating body. The beneficial effects of such a rotating assembly are as follows.

First, when the first tenon of the rotary shaft is engaged with the convex rib of the matching hole, i.e., the side wall of the first tenon butts against the side wall of the convex rib, the rotary shaft can be prevented from moving along the axial direction. When the rotary shaft rotates by a certain angle relative to the matching hole, the side wall of the first tenon is separated from the side wall of the convex rib, and then the rotary shaft can move along the axial direction. It can be seen that by simply rotating the rotary shaft, the movement and fixation of the rotary shaft in the axial direction can be easily controlled, thereby greatly simplifying the control process and facilitating operation.

Second, when the first tenon butts against the side wall of the convex rib, the position-limiting switch and the second tenon can be clamped together, so that the rotary shaft can be prevented from rotating relative to the accommodating body, i.e., it can be ensured that the position of the rotary shaft relative to the accommodating body is fixed, and there is no relative movement between the rotary shaft and the accommodating body. It can be seen that the convex rib of the matching hole and the position-limiting switch are used respectively to control the movement of the rotary shaft in different directions, so that the position of the rotary shaft relative to the accommodating body can be fixed reliably, thereby improving the connection reliability between the rotary shaft and the accommodating body.

Third, the structure of the rotating assembly is relatively simple, namely, there are only the first and second tenons provided on the outer wall of the rotary shaft and the convex rib provided on the inner wall of the matching hole of the accommodating body, so it is easy to manufacture and convenient to assemble. On the premise of ensuring that the position of the rotary shaft relative to the accommodating body can be fixed reliably, it is helpful to reduce the production cost and improve the competitiveness of product.

An embodiment of the present disclosure also provides a handle having the rotating assembly. The rotation of the body portion relative to the gripping portion can be realized by using the rotating assembly, and the beneficial effects are as described above. At the same time, the rotatable handle can be used in a wider range of occasions. Different functional components may be provided on different surfaces of the body portion, thereby improving the diversity of functions of the handle and further increasing the competitiveness of product.

BRIEF DESCRIPTION OF DRAWINGS

The present invention will hereinafter be described in conjunction with the following drawing figures, wherein like numerals denote like elements, and.

Figure 1:
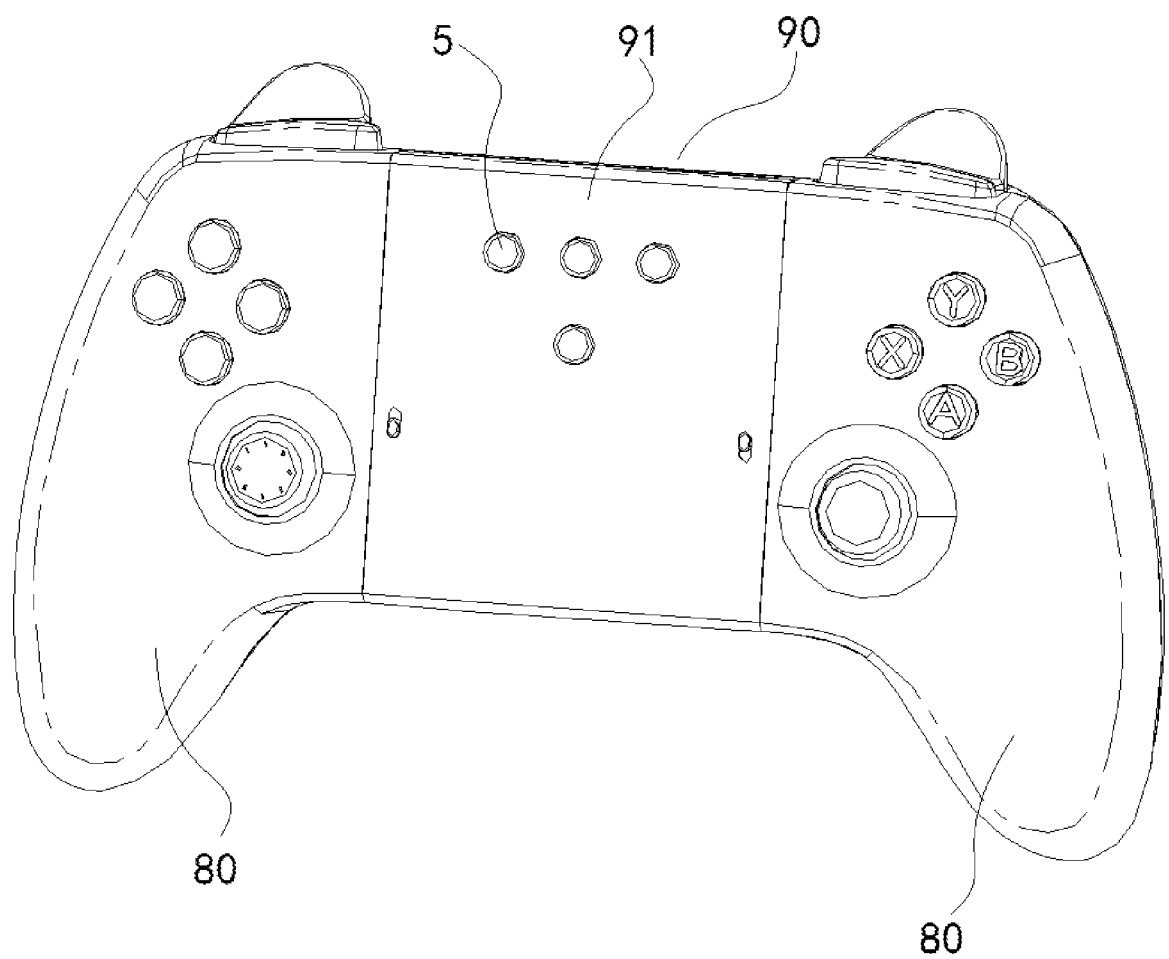
FIG. 1 is a schematic view of a handle having a rotating assembly at an initial position according to an embodiment of the present disclosure.

In the drawings: 1: rotary shaft, 11: first tenon, 12: second tenon, 13: shaft body;

2: accommodating body, 21: matching hole, 22: convex rib, 23: positioning rib, 24: connecting rib;

3: position-limiting switch, 31: clamping arm, 32: clamping opening, 33: contact, 34: stand column, 35: mounting column;

4: elastic member;

5: control key;

6: screen;

80: gripping portion;
90: body portion;
91: first cover, 911: position-limiting hole;
92 second cover, 921: notch, 922: boss.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all of, the embodiments of the present disclosure. Based on the embodiments of the present disclosure, any other embodiment obtained by a person of ordinary skill in the art without paying any creative effort shall fall within the protection scope of the present disclosure.

In order to enable those skilled in the art to better understand the solutions of the present disclosure, the present disclosure will be further described in detail below in conjunction with the drawings and specific embodiments.

The rotating assembly according to an embodiment of the present disclosure, referring to FIGS. 3, 6 to 12, comprises a rotary shaft 1, an accommodating body 2 and a position-limiting switch 3.

Figure 6:
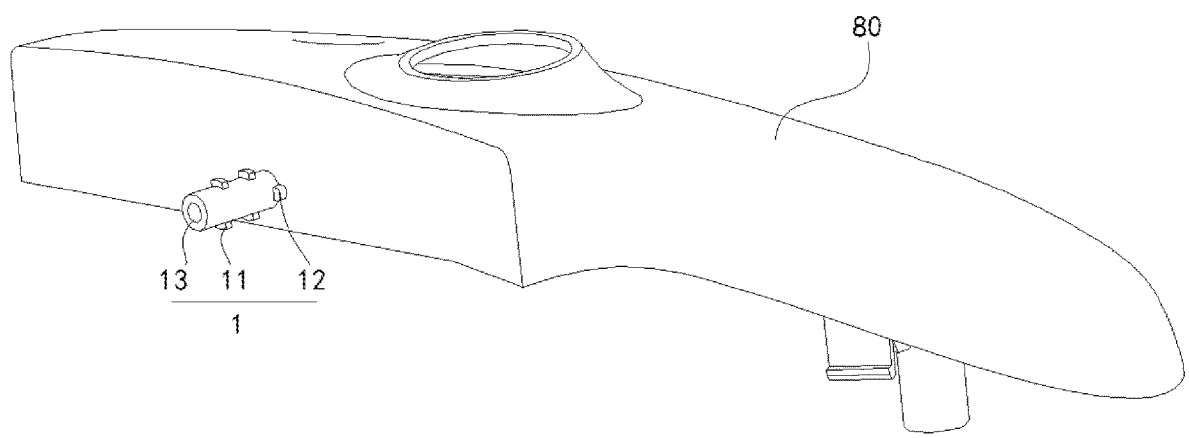
FIG. 6 is a schematic view of a gripping portion of a handle having a rotating assembly according to an embodiment of the present disclosure.

As shown in FIG. 6, the rotary shaft 1 may have a substantially cylindrical shape and may be formed as a whole by injection molding. The rotary shaft 1 comprises a shaft body 13, a first tenon 11 and a second tenon 12. The shaft body 13 may be specifically a cylinder. The first tenon 11 and the second tenon 12 are provided on the outer wall of the shaft body 13. The first tenon 11 and the second tenon 12 may be provided in a block shape, i.e., the first tenon 11 and the second tenon 12 have a certain height (extending along the radial direction of the rotary shaft 1), a certain width (extending along the axial direction of the rotary shaft 1), and a certain length (extending along the circumferential direction of the rotary shaft 1).

The first tenon 11 and the second tenon 12 herein should be disposed along the axial direction of the rotary shaft 1, and the first tenon 11 and the second tenon 12 should be disposed in different circumferential directions of the rotary shaft 1.

Figure 7:
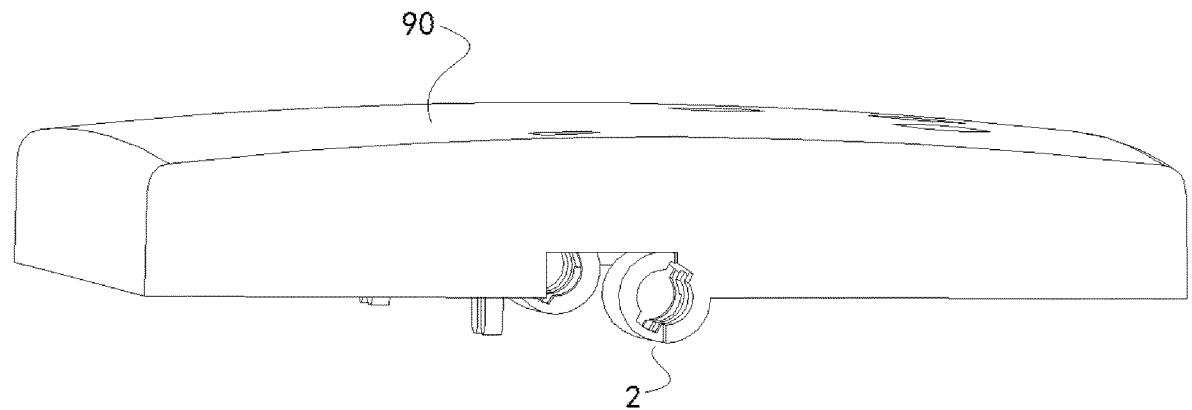
FIG. 7 is a schematic view of a body portion of a handle having a rotating assembly according to an embodiment of the present disclosure.
Figure 8:
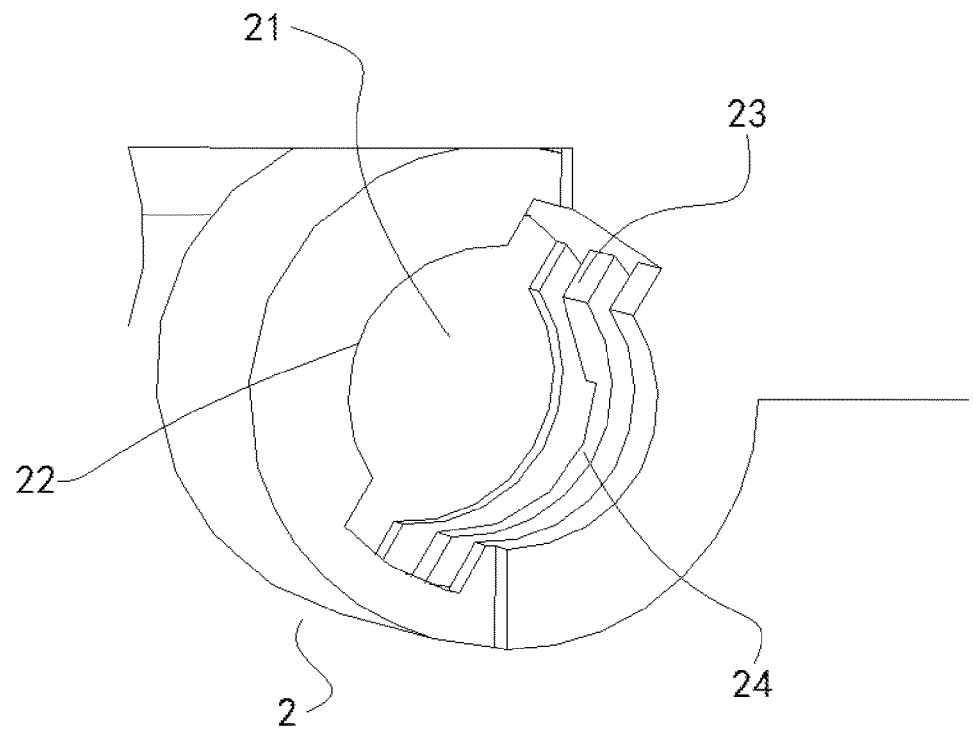
FIG. 8 is a partial enlarged view of an accommodating body in FIG. 7.

As shown in FIGS. 7 and 8, the relative position of the accommodating body 2 is fixed; it may have a substantially hollow cylindrical shape and may be formed as a whole by injection molding. The accommodating body 2 is provided with a matching hole 21, and the first tenon 11 of the rotary shaft 1 can be inserted into the matching hole 21. When the rotary shaft 1 rotates, the first tenon 11 rotates in the matching hole 21.

The axis of the rotary shaft 1 and the axis of the accommodating body 2 may be horizontal and preferably collinear. The axial direction of the rotary shaft 1 and the axial direction of the accommodating body 2 may be regarded as the same direction.

As stated above, the first tenon 11 and the second tenon 12 are provided along the axial direction of the rotary shaft 1, so when the first tenon 11 of the rotary shaft 1 is inserted into the matching hole 21, the second tenon 12 may be located outside the accommodating body 2. In other words, with the end of the rotary shaft 1 close to the first tenon 11 as the benchmark, the rotary shaft 1 is gradually inserted into the matching hole 21. When the first tenon 11 is located in the matching hole 21, the second tenon 12 may be located outside the accommodating body 2.

The matching hole 21 may have a circular shape. Obviously, the diameter of the matching hole 21 should be larger than the diameter of the rotary shaft 1. The inner wall of the matching hole 21 is provided with a convex rib 22, which may be configured as a block, i.e., the convex rib 22 has a certain height (extending along the radial direction of the matching hole 21), a certain width (extending along the axial direction of the matching hole 21), and a certain length (extending along the circumferential direction of the matching hole 21).

It should be noted that the convex rib 22 is not provided around the entire circumference of the matching hole 21. Since the convex rib 22 has a certain height, it will reduce the diameter of the matching hole 21, so the height of the convex rib 22 should meet the standard of "not hindering the rotary shaft 1 from inserting into the matching hole 21", i.e., it should ensure that the first tenon 11 can be inserted into the matching hole 21.

As shown in FIGS. 8 to 12, when the first tenon 11 is inserted into the matching hole 21 from outside to inside, the first tenon 11 avoid the convex rib 22, i.e., the first tenon 11 should not contact the convex rib 22. When the first tenon 11 is inserted into the matching hole 21, the first tenon 11 is closer to the inner side of the matching hole 21 than the convex rib 22.

The rotary shaft 1 is controlled to rotate, so that the first tenon 11 rotates in the matching hole 21. When the first tenon 11 rotates to the position shown in FIGS. 9 and 10, the outer wall of the first tenon 11 fits attaches to the inner wall of the convex rib 22, i.e., the outer wall of the first tenon 11 butts against the inner wall of the convex rib 22. If at this moment, an axial force toward the outer side of the accommodating body 2 is applied to the rotary shaft 1, the first tenon 11 butts against the convex rib 22, so the rotary shaft 1 will not be separated from the accommodating body 2, so that the position of the rotary shaft 1 relative to the accommodating body 2 is fixed in the axial direction of the rotary shaft 1.

Figure 9:
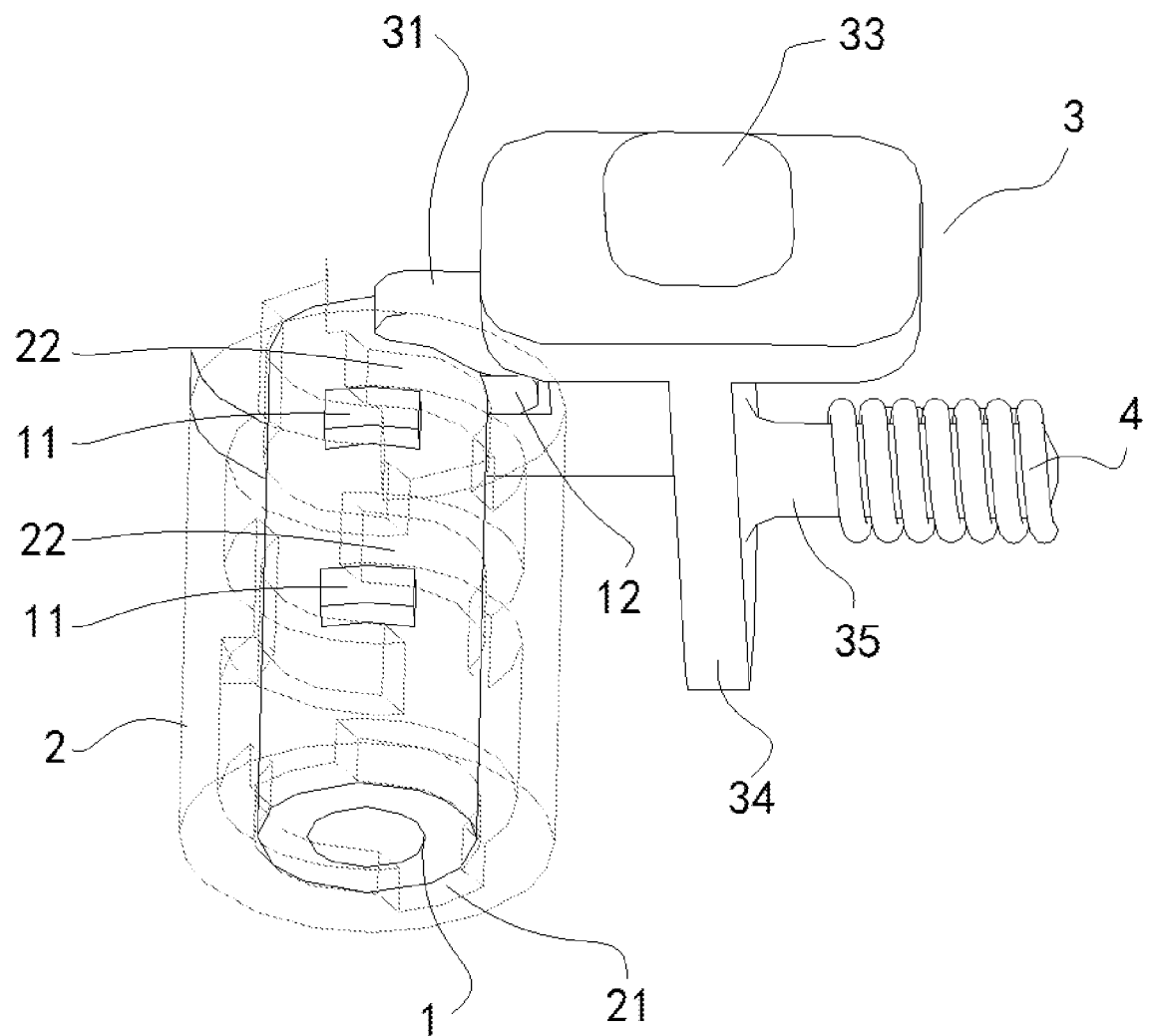
FIG. 9 is a perspective view of a rotating assembly when engaged according to an embodiment of the present disclosure.

Taking the orientation shown in FIG. 9 as an example, when the rotary shaft 1 rotates in a counterclockwise direction, the first tenon 11 rotates in a counterclockwise direction relative to the convex rib 22. When the first tenon 11 rotates to the end of the convex rib 22, i.e., when it rotates to a position of the matching hole 21 where the convex rib 22 is not provided, the first tenon 11 and the convex rib 22 are separated, i.e., the position of the rotary shaft 1 relative to the accommodating body 2 is movable in the axial direction of the rotary shaft 1, and the rotary shaft 1 can be separated from the accommodating body 2.

It can be seen that, the assemble and disassemble process of the rotary shaft 1 and the accommodating body 2 are described above, and the connection and separation between the rotary shaft 1 and the accommodating body 2 can be completed only through the engagement of the first tenon 11 and the convex rib 22. The structure is simple and the operation is convenient.

In order to ensure that the relative positions of the rotary shaft 1 and the accommodating body 2 are fixed after connection, the rotating assembly further comprises a position-limiting switch 3. As shown in FIG. 9, when the outer wall of the first tenon 11 attaches to the inner wall of the convex rib 22, the position of the rotary shaft 1 relative to the accommodating body 2 is fixed in the axial direction of the rotary shaft 1. At this moment, the second tenon 12 may be located outside the accommodating body 2. The position-limiting switch 3 is used to clamp the second tenon 12 to avoid the rotation of the rotary shaft 1 relative to the accommodating body 2, i.e., the relative positions of the rotary shaft 1, the accommodating body 2 and the position-limiting switch 3 are fixed, thereby achieving the fixation of relative positions of the rotary shaft 1 and the accommodating body 2.

It can be seen that, on the premise that the second tenon 12 is located outside the accommodating body 2, in order to achieve the clamping of the second tenon 12, the position-limiting switch 3 should also be located outside the accommodating body 2. Of course, according to the actual needs, there are many options for the position of the second tenon 12. Correspondingly, the position of the position-limiting switch 3 should also be adjusted accordingly.

When it is necessary to disassemble the rotary shaft 1 from the accommodating body 2, first, the position-limiting switch 3 is controlled to separate from the second tenon 12, the position-limiting switch 3 moves in the direction away from the second tenon 12, and then the rotary shaft 1 is rotated. As stated above, when the first tenon 11 rotates to a position of the matching hole 21 where the convex rib 22 is not provided, the first tenon 11 is separated from the convex rib 22. Finally, the rotation shaft 1 is controlled to move outward along the axial direction of the accommodating body 2, and the rotation shaft 1 can be separated from the accommodating body 2.

Figure 12:
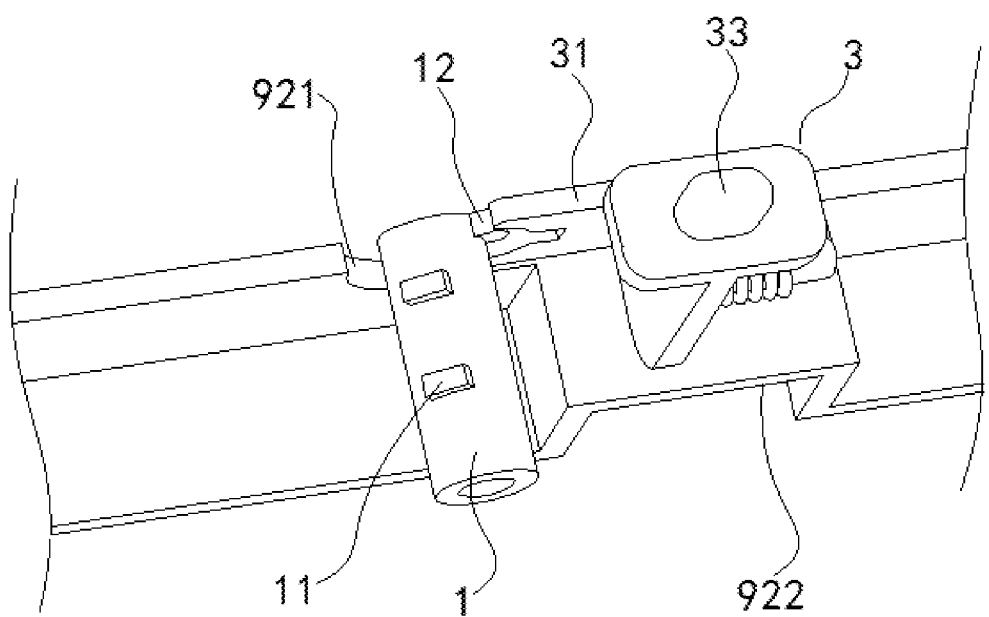
FIG. 12 is a schematic view of the structure of a rotary shaft of the rotating assembly when rotated according to an embodiment of the present disclosure.

As shown in FIG. 12, the second tenon 12 is farther away from the inner side of the accommodating body 2 than the first tenon 11, i.e., the first tenon 11 and the second tenon 12 are distributed along the axis direction of the rotary shaft 1 (in different circumferential directions of the rotary shaft 1). As mentioned above, the first tenon 11 is inserted into the matching hole 21 and engages with the convex rib 22, while the second tenon 12 is always located outside the matching hole 21, and the position-limiting switch 3 and the second tenon 12 can be clamped together.

The first tenon 11 and the second tenon 12 may be located in different radial directions of the rotary shaft 1, i.e., the first tenon 11 and the second tenon 12 are located in different circumferential directions and also located in different radial directions of the rotary shaft 1. In this way, it is helpful to optimize the forces on the rotary shaft 1, and prevent the convex rib 22 and the position-limiting switch 3 from acting on the rotary shaft 1 in the same radial direction and the same circumferential direction, thereby improving the reliability of the rotary shaft 1 in use and ensuring the service life of the rotating assembly.

Preferably, the first tenon 11 and the second tenon 12 are distributed with an included angle of 90° formed therebetween. Namely, if in the projection along the axial direction of the rotary shaft 1, the connecting line between the first tenon 11 and the axis of the rotary shaft 1 is marked as the first connecting line, and the connecting line between the second tenon 12 and the axis of the rotary shaft 1 is marked as the second connecting line, the included angle between the first connecting line and the second connecting line is 90°. In this way, the distance between the first tenon 11 and the second tenon 12 is reasonable, and they do not interfere with each other, so that their respective functions may be realized to the maximum, thereby making the operation of the rotary shaft 1 reliable.

Figure 11:
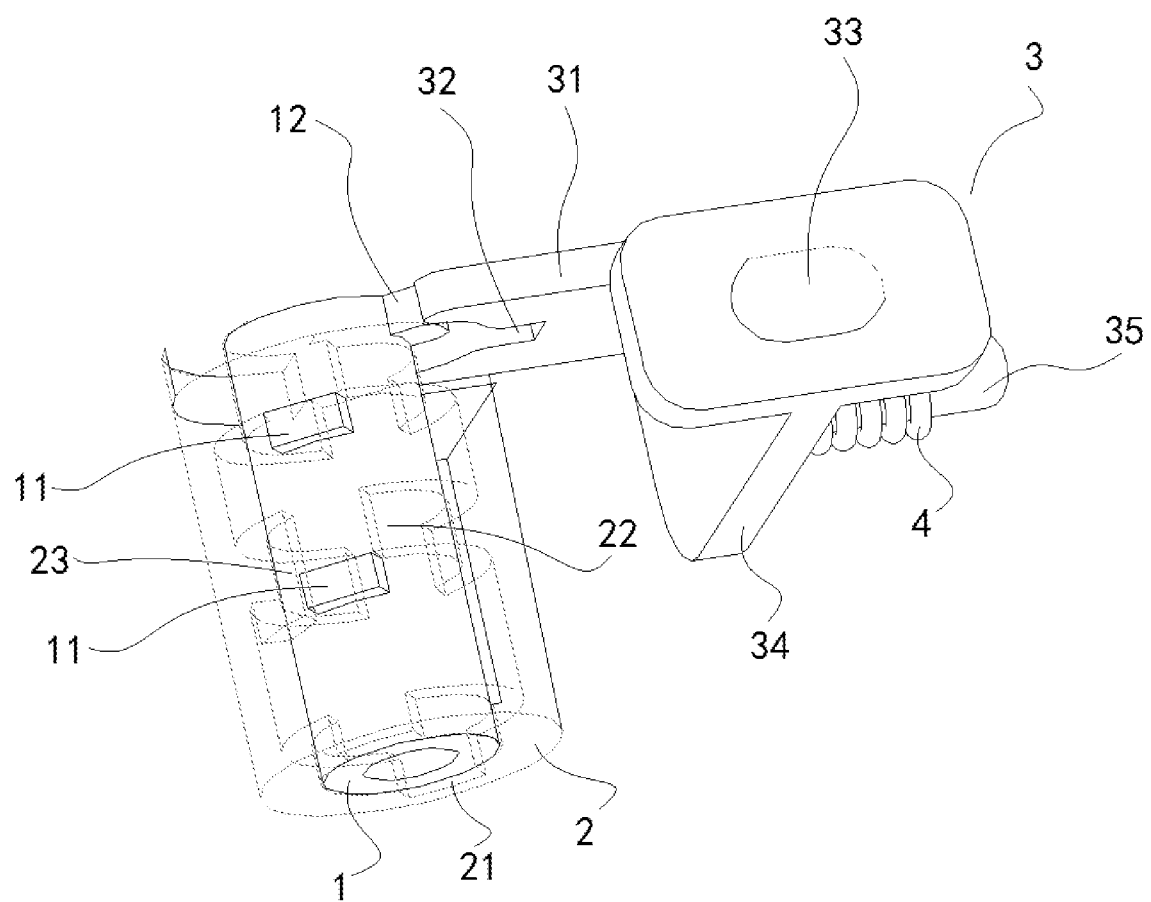
FIG. 11 is a perspective view of a rotary shaft of the rotating assembly when rotated according to an embodiment of the present disclosure.

Referring to FIGS. 8 and 11, the inner wall of the matching hole 21 is also provided with a positioning rib 23, the positioning rib 23 and the convex rib 22 are spaced from each other in a circumferential direction of the matching hole 21, and a width of the positioning rib 23 along the axial direction of the matching hole 21 is greater than a width of the convex rib 22 along the axial direction of the matching hole 21.

As shown in FIG. 11, a positioning rib 23 and a convex rib 22 may be provided in the circumferential direction of the matching hole 21. There is an interval between the positioning rib 23 and the convex rib 22. The length of the interval should be greater than or equal to the length of the first tenon 11 (the distance extending along the circumferential direction of the rotary shaft 1). Namely, when the side wall of the first tenon 11 is separated from the side wall of the convex rib 22, the first tenon 11 should be located between the positioning rib 23 and the convex rib 22.

When the rotary shaft 1 needs to be disassembled from the accommodating body 2, first the position-limiting switch 3 is controlled to move in a direction far away from the second tenon 12, and then the rotary shaft 1 is rotated. When the end face of the first tenon 11 butts against the end face of the positioning rib 23, it indicates that at this moment the side wall of the first tenon 11 and the side wall of the convex rib 22 have been out of contact, and the first tenon 11 is located between the positioning rib 23 and the convex rib 22. At this moment, the rotary shaft 1 may be controlled to move outward along the axial direction of the accommodating body 2, and the rotary shaft 1 is separated from the accommodating body 2.

The relative positions between the first tenon 11 and the convex rib 22 may be accurately acquired by using the positioning rib 23. During the rotation of the rotary shaft 1, as shown in FIG. 11, when the end face of the first tenon 11 butts against the end face of the positioning rib 23, the side wall of the first tenon 11 is separated from the side wall of the convex rib 22, i.e., the first tenon 11 is located between the positioning rib 23 and the convex rib 22, and the rotary shaft 1 cannot continue to rotate at this moment. When the user finds that the rotary shaft 1 cannot continue to rotate, it indicates that the side wall of the first tenon 11 and the side wall of the convex rib 22 have been out of contact, and an axial force facing outward (in the direction of approaching the position-limiting switch 3) may be applied to the rotary shaft 1 to make the rotary shaft 1 separate from the accommodating body 2.

Figure 10:
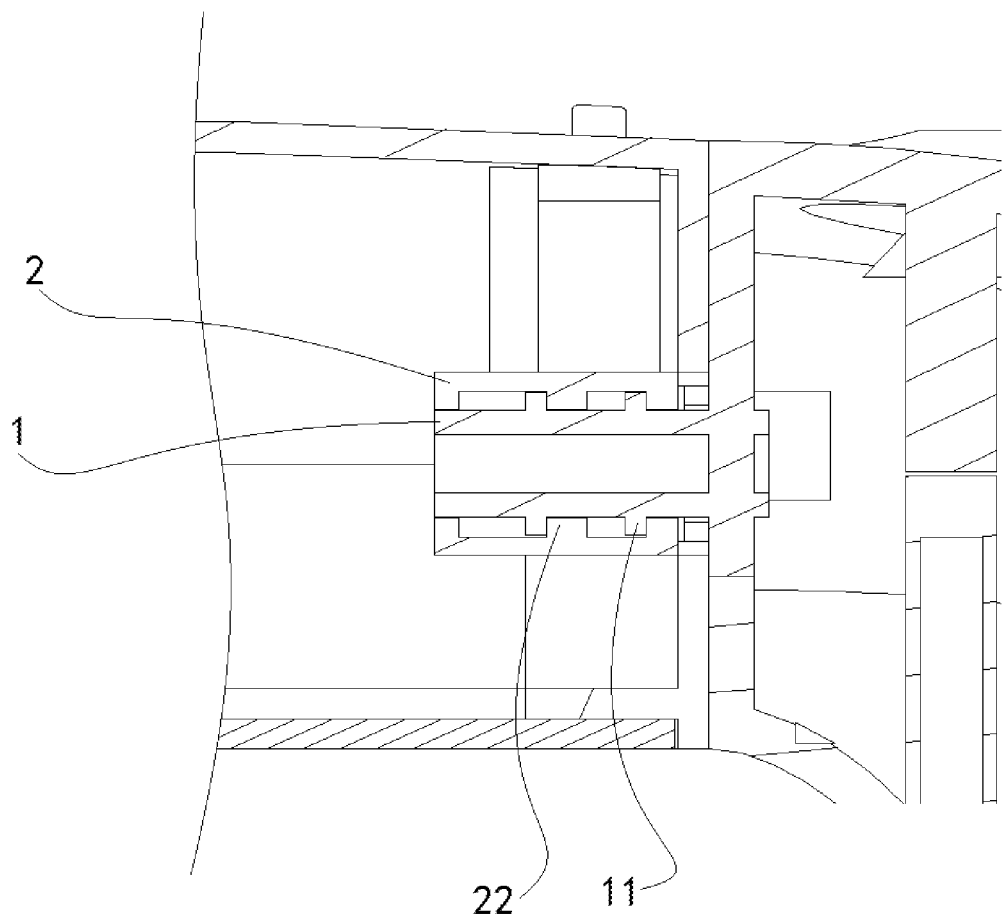
FIG. 10 is a sectional view of a rotating assembly along an axis of a rotation shaft when engaged according to the embodiment of the present disclosure.

Referring to FIGS. 9 and 10, there may be multiple convex ribs 22, and the multiple convex ribs 22 are provided at intervals along the axial direction of the matching hole 21.

FIGS. 9 and 10 show the case where two convex ribs 22 are provided at an interval along the axial direction of the matching hole 21. There may also be two first tenons 11. The two first tenons 11 are provided at an interval along the axial direction of the rotation shaft 1. All the first tenons 11 can simultaneously butt against or separate from different convex ribs 22. The interval between the two convex ribs 22 shall be equal to the interval between the two first tenons 11.

Taking the orientation shown in FIG. 9 as an example, when the relative positions of the rotary shaft 1 and the accommodating body 2 are fixed, the first tenon 11 at the upper part butts against the convex rib 22 at the upper part, i.e., the side walls of them are in contact. At the same time, the first tenon 11 at the lower part butts against the convex rib 22 at the lower part, i.e., the side walls of them are in contact. It can be seen that, in this way, it can effectively ensure the fixation of the rotary shaft 1 and the accommodating body 2 in the axial direction, and avoid that the positions of the rotary shaft 1 and the accommodating body 2 cannot be fixed due to the failure of engagement between one group of the first tenon 11 and the convex rib 22.

When the rotation shaft 1 and the accommodating body 2 need to be disconnected, the rotation shaft 1 is rotated, and all the first tenons 11 rotate synchronously. The first tenon 11 at the upper part is disconnected from the convex rib 22 at the upper part. At the same time, the first tenon 11 at the lower part is disconnected from the convex rib 22 at the lower part. At this moment, an axial force towards the outside may be applied to the rotation shaft 1, and the rotation shaft 1 is separated from the accommodating body 2.

Of course, there may be other number of convex ribs 22. Correspondingly, the number of the first tenon 11 should be the same as the number of convex ribs 22, and the engagement mode is similar to the above, which will not be repeated here.

Referring to FIG. 8, the inner wall of the matching hole 21 may further be provided with a connecting rib 24 that is connected with the positioning rib 23. In the axial direction of the matching hole 21, the width of the connecting rib 24 is equal to the width of the convex rib 22, i.e., the width of the connecting rib 24 is less than the width of the positioning rib 23.

The two ends of the convex rib 22 are respectively spaced from the ends of the connecting rib 24 and the ends of the positioning rib 23, and two first tenons 11 are provided in the same circumferential direction of the rotary shaft 1.

In other words, there may be a convex rib 22, a positioning rib 23 and a connecting rib 24 in the same circumferential direction of the matching hole 21. The positioning rib 23 and the connecting rib 24 are connected, and can be regarded as an integral rib. The width of the integral rib is uneven. There are certain intervals between two ends of the integral rib and two ends of the convex rib 22. The intervals should be greater than or equal to the length of the first tenon 11 (the distance extended along the circumferential direction of the rotary shaft 1), These intervals may be considered as notches.

Taking the orientation shown in FIG. 8 as an example, when the rotary shaft 1 and the accommodating body 2 need to be fixedly connected, one of the first tenons 11 aligns with a notch at the upper right (the interval formed by the positioning rib 23 and the convex rib 22), and the other of the first tenons 11 aligns with a notch at the lower left (the interval formed by the connecting rib 24 and the convex rib 22), thereby controlling the rotary shaft 1 to insert into the matching hole 21. Due to the existence of the second tenon 12, the second tenon 12 is obstructed by the side wall of the convex rib 22, the positioning rib 23 or the connecting rib 24 (or attaches to them), and cannot be inserted into the matching hole 21. When the second tenon 12 attaches to the side wall of the convex rib 22, the positioning rib 23 or the connecting rib 24, it indicates that the two first tenons 11 are closer to the inner side of the accommodating body 2 than the convex rib 22.

Then the rotary shaft 1 is rotated. Take the orientation shown in FIG. 9 as an example, the rotary shaft 1 is rotated in a clockwise direction. Referring to FIG. 8, the side wall of one of the first tenons 11 attaches to the side wall of the convex rib 22, and the side wall of the other of the first tenons 11 attaches to the side wall of the connecting rib 24. In this way, the axial positions of the rotary shaft 1 and the accommodating body 2 can be fixed. At this moment, the position-limiting switch 3 can move toward the second tenon 12, so that the position-limiting switch 3 and the second tenon 12 are clamped together, thereby completing the fixation of the rotary shaft 1 and the accommodating body 2.

When it is needed to disassemble the rotary shaft 1 and the accommodating body 2, first, the position-limiting switch 3 is controlled to move away from the second tenon 12, taking the orientation shown in FIG. 9 as an example, and then the rotary shaft 1 is rotated in a counterclockwise direction. The side walls of the two first tenons 11 slide respectively relative to the side wall of the convex rib 22 and the side wall the connecting rib 24. Referring to the orientation shown in FIG. 8, when the end of one of the first tenons 11 butts against the end face of the positioning rib 23, the first tenon 11 is located at the notch at the upper right (the gap formed by the positioning rib 23 and the convex rib 22), and the other of the first tenons 11 is aligned with the notch at the lower left (the gap formed by the connecting rib 24 and the convex rib 22). At this moment, the rotary shaft 1 and the accommodating body 2 are not constrained in the axial direction, and a force can be applied to the rotary shaft 1 to separate the rotary shaft 1 from the accommodating body 2.

Referring to FIGS. 9, 11 and 12, the position-limiting switch 3 can move to be close to or far away from the second tenon 12 along the radial direction of the rotary shaft 1 to achieve the clamping or loosening of the second tenon 12. Obviously, by controlling the position-limiting switch 3 to be close to or far away from the second tenon 12 in the radial direction of the rotation shaft 1, the position-limiting switch 3 can be clamped or loosened relative to the second tenon 12.

Referring to FIG. 11, the position-limiting switch 3 comprises a clamping arm 31 having a clamping opening 32. The clamping opening 32 is expanded as it approaches the rotary shaft 1 along the radial direction of the rotary shaft 1, and the shape of the clamping opening 32 may be configured to be the same as the shape of the second tenon 12. When the clamping opening 32 clamps the second tenon 12, the side wall of the rotary shaft 1 that is located in the same circumferential direction as the second tenon 12 may also be clamped by the clamping opening 32, thereby effectively improving the clamping reliability of the second tenon 12.

In the present disclosure, an elastic member 4 may be used to apply a preload force to the position-limiting switch 3, so that the position-limiting switch 3 always has a tendency to move towards the second tenon 12, as shown in FIGS. 9, 11 and 12.

The position-limiting switch 3 may further comprise a contact 33, a stand column 34 and a mounting column 35. The position-limiting switch 3 may be integrally formed. The contact 33 may be disposed on the top of the stand column 34, and two sides of the stand column 34 may be respectively provided with the clamping arm 31 and the mounting column 35. The elastic element 4 may specifically be a spring, which is sleeved on the mounting column 35 arranged horizontally. One end of the elastic element 4 may butt against the stand column 34, and the other end of the elastic element 4 may butt against a fixed position.

Taking the orientation shown in FIG. 11 as an example, when a hand pushes the contact 33 to the right, the position-limiting switch 3 moves to the right, at this moment, the elastic element 4 is compressed, the clamping opening 32 is separated from the second tenon 12, and the rotary shaft 1 can rotate relative to the accommodating body 2. When the hand reduces the push force on the contact 33, the elastic potential energy of the elastic element 4 is released, and the elastic element 4 pushes the position-limiting switch 3 to move to the left.

The present disclosure provides a handle having a rotating assembly. The handle comprises the rotating assembly described in the above specific embodiments, and also comprises two gripping portions 80 and a body portion 90. The body portion 90 is disposed between the two gripping portions 80.

The body portion 90 may be provided with the rotary shaft 1 of the rotating assembly as stated above, and the two gripping portions 80 should be provided with the accommodating body 2 and the position-limiting switch 3. Of course, it is also possible to provide the rotary shaft 1 on the two gripping portions 80, and provide the accommodating body 2 and the position-limiting switch 3 on the body portion 90. Only the embodiment of providing the rotary shaft 1 on the two gripping portions 80 is given herein.

Referring to FIGS. 1 to 5, the body portion 90 and the two gripping portions 80 can be fixedly connected by using the rotating assembly as stated above. When the two gripping portions 80 need to be replaced, please refer to the disassembly process of the rotary shaft 1 and the accommodating body 2 as described above.

In order to improve the functional diversity of the handle in the present disclosure, two surfaces of the body portion 90 may have different functions, and the two surfaces of the body portion 90 may be respectively provided with a control key 5 and a screen 6. Further, the body portion 90 may comprise a first cover 91 and a second cover 92 that are buckled together. An accommodating cavity is formed between the first cover 91 and the second cover 92 to accommodate circuit boards, components, etc. The first cover 91 is provided with the control key 5, and the second cover 92 is provided with the screen 6.

Figure 2:
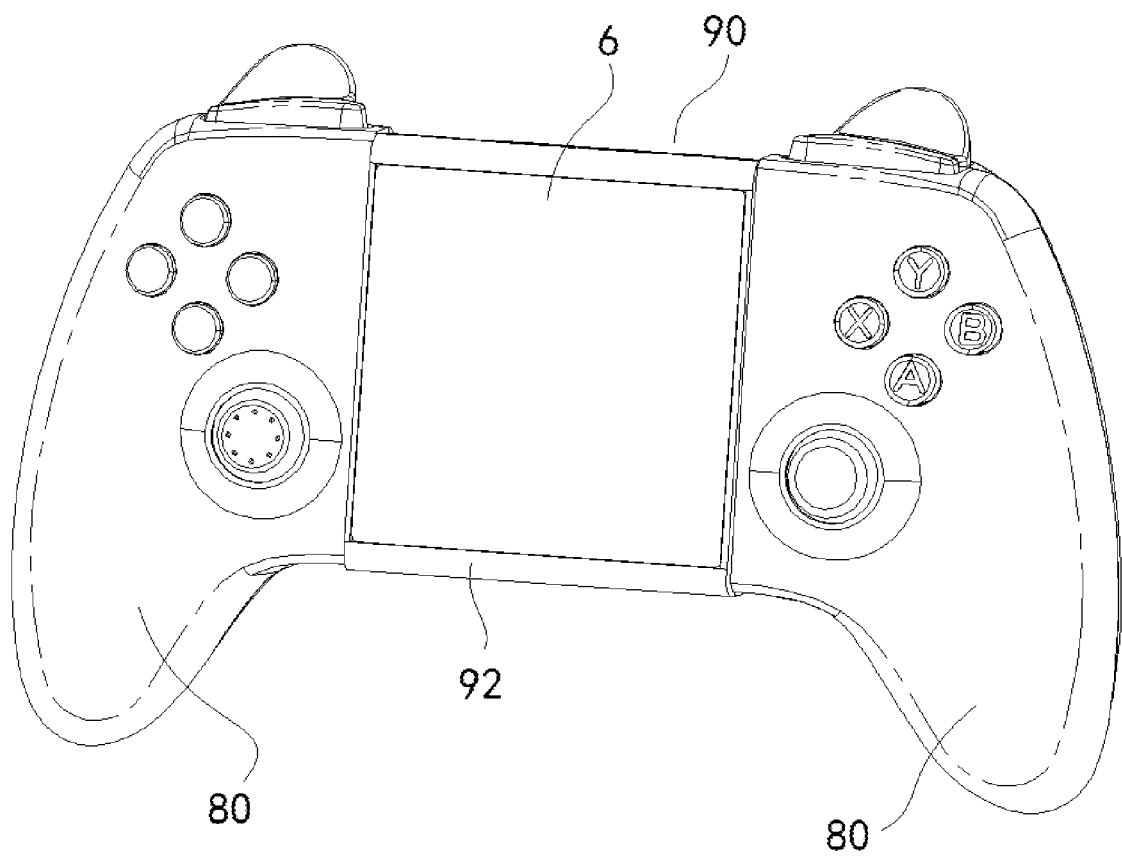
FIG. 2 is the schematic view of a handle having a rotating assembly after rotation according to an embodiment of the present disclosure.

When the handle needs to be connected with the display screen, as shown in FIG. 1, the first cover 91 is flush with the front face of the gripping portion 80, and at this moment the handle can be used to operate computer games, etc. When a game provided by the handle itself is to be operated, as shown in FIG. 2, the second cover 92 is flush with the front face of the gripping portion 80. At this moment, the game operation may be performed by viewing the screen 6.

The body portion 90 may be flipped by 180° relative to the two gripping portions 80, and the body portion 90 may be fixed at the positions shown in FIG. 1 and FIG. 2 relative to the two gripping portions 80. Therefore, in the rotating assembly as described above, the number of the second tenons 12 of the rotary shaft 1 should be two, and the connecting line of the two second tenons 12 should be the diameter of the rotary shaft 1 (with a difference of 180°), and the two second tenons 12 may be provided on the same circumferential direction of the rotary shaft 1.

In this way, no matter whether the first cover 91 is flush with the front face of the gripping portion 80 or the second cover 92 is flush with the front face of the gripping portion one of the second tenons 12 will be clamped together with the position-limiting switch 3 to achieve the relative position fixation between the body portion 90 and the two gripping portions 80.

Figure 3:
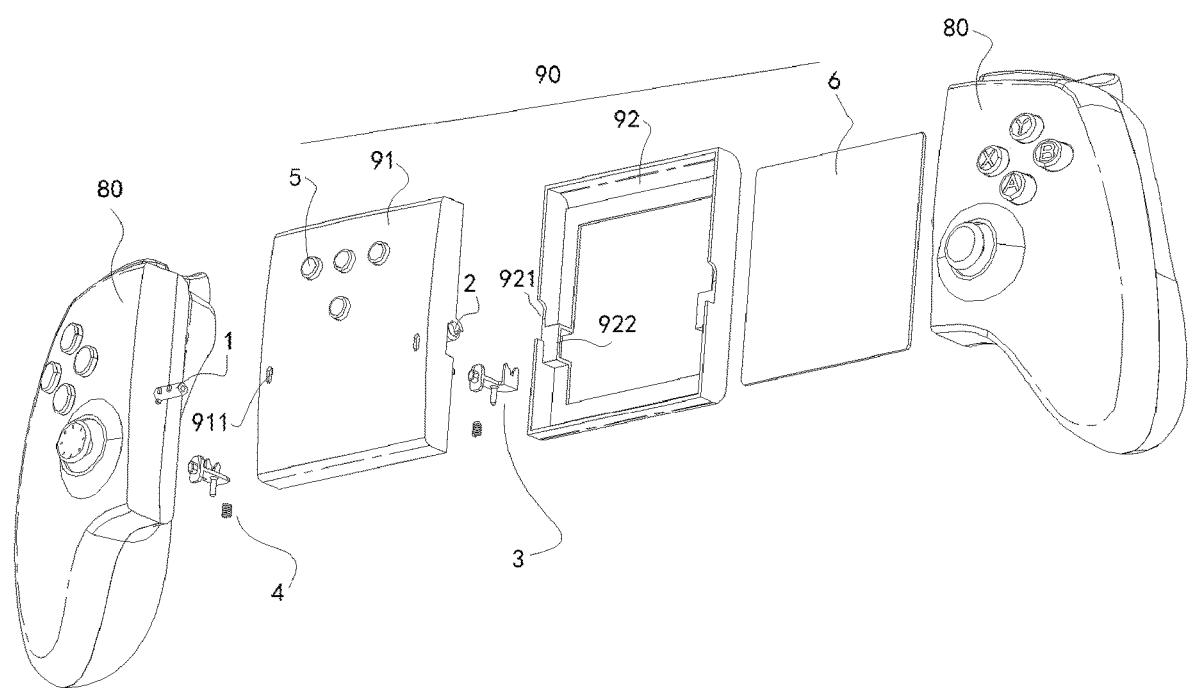
FIG. 3 is an exploded view of a handle having a rotating assembly according to an embodiment of the present disclosure.

Referring to FIGS. 3 and 12, the accommodating body 2 may be disposed at the bottom of the side wall of the first cover 91. The surface of the first cover 91 is provided with a position-limiting hole 911, the side wall of the second cover 92 is provided with a notch 921, and a boss 922 is provided at a position on the inner side of the second cover 92 that is close to the notch 921.

The position-limiting switch 3 may be disposed on the upper surface of the boss 922. During the assembly process, when the relative positions of the first cover 91 and the second cover 92 are fixed (after the body portion 90 is installed), the contact 33 of the position-limiting switch 3 extends out of the position-limiting hole 911, and the accommodating body 2 is overlapped with the notch 921. When the gripping portion 80 needs to be installed on the body portion 90, the rotary shaft 1 is inserted into the accommodating body 2, and the specific process may refer to the above description.

Figure 4:
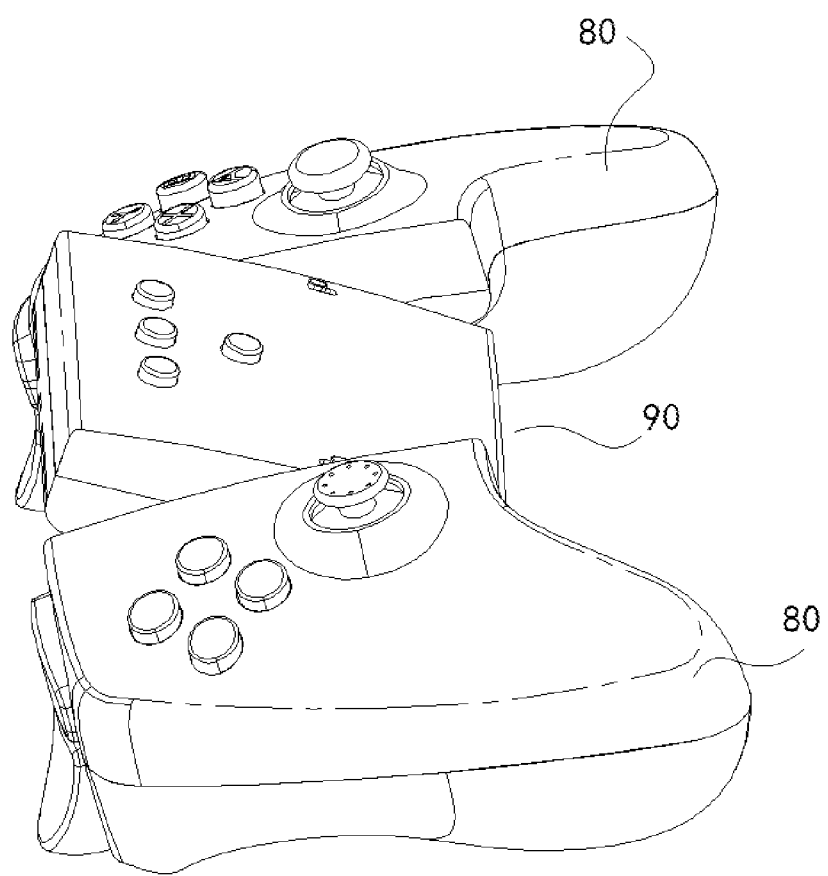
FIG. 4 is a schematic view of a handle having a rotating assembly during rotation according to an embodiment of the present disclosure.
Figure 5:
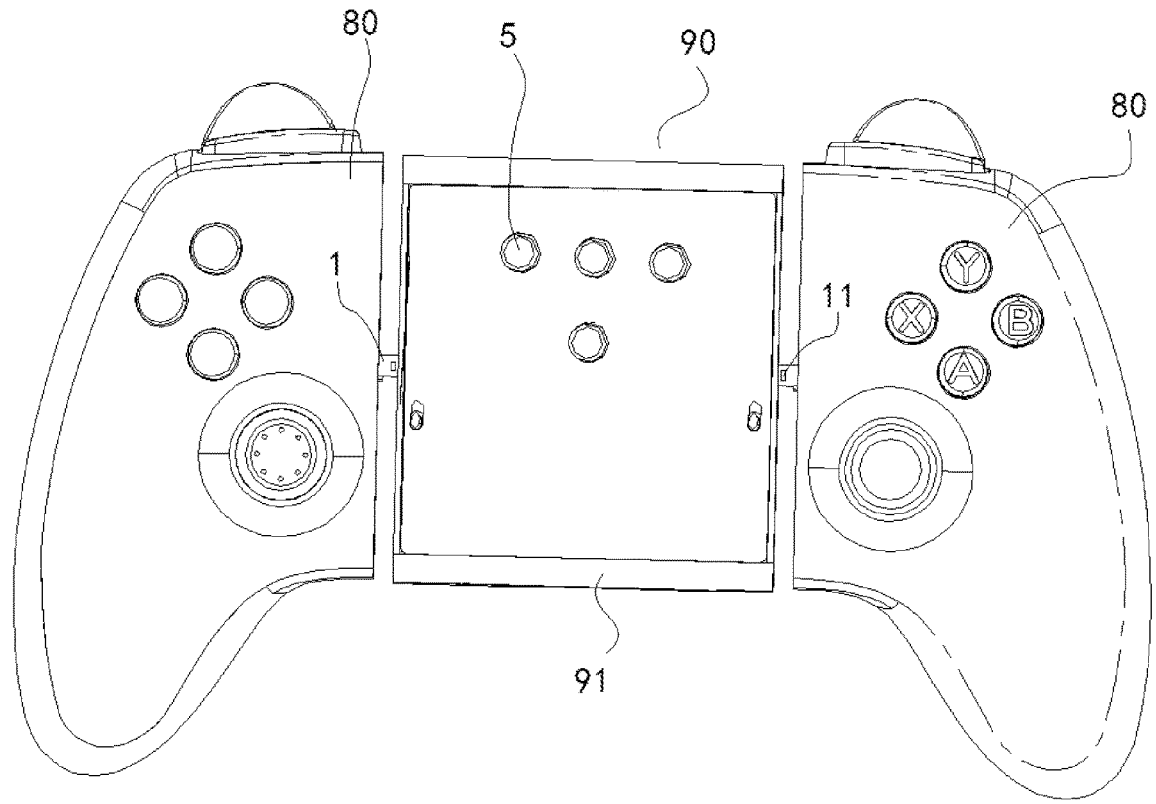
FIG. 5 is a schematic view of a handle having a rotating assembly when gripping portions are pulled out relative to a body portion according to an embodiment of the present disclosure.

When it is needed to change the function of the handle and rotate the gripping portion 80 by 180°, first, the position-limiting switch 3 is touched to move in the direction away from the second tenon 12 (within the range of the position-limiting hole 911), the position-limiting switch 3 is separated from the second tenon 12, and then the gripping portion 80 is rotated in a counterclockwise direction (taking the orientation shown in FIG. 4 as an example). The rotary shaft 1 rotates relative to the accommodating body 2, i.e., the gripping portion 80 rotates relative to the body portion 90. When the first tenon 11 is separated from the convex rib 22 (at this moment, the first tenon 11 is located between the positioning rib 23 and the convex rib 22, or between the convex rib 22 and the connecting rib 24), the gripping portion 80 is controlled to move towards the outside of the body portion 90, referring to FIGS. 4 and 5 (the gripping portion 80 is not rotated to 180°). Then, the gripping portion 80 is directly rotated by 180° in a counterclockwise direction. At this moment, the first tenon 11 may be aligned with the gap between the positioning rib 23 and the convex rib 22, or with the gap between the convex rib 22 and the connecting rib, to drive the gripping portion 80 to attach to the body portion 90. When the gripping portion 80 attaches to the body portion 90, the first tenon 11 is closer to the inner side of the accommodating body 2 than the convex rib 22. Then, the gripping portion 80 is rotated in a clockwise direction (the rotation angle is the same as the rotation angle required for the first tenon 11 and the convex rib 22 to be out of contact). At this moment, the side wall of the first tenon 11 butts against the side wall of the convex rib 22. Finally, the second tenon 12 is clamped by the position-limiting switch 3, and the gripping portion 80 realizes a 180° rotation.

It can be seen that the two gripping portions 80 can flip with respect to the body portion 90, thereby significantly increasing the occasions that the handle can be used. By providing different functional components on different surfaces of the body portion 90, the functional diversity of the handle can be improved and the competitiveness of the product can be further increased.

It should be noted that in this specification, relational terms such as "first" and "second" are only used to distinguish one entity from other entities, and do not necessarily require or imply any actual relationship or order between these entities.

The rotating assembly and the handle having the same according to the present disclosure have been described in detail above. In the present disclosure, specific examples are used to explain the principle and implementation modes of the present disclosure. The above embodiments are only used to help understand the methods and core ideas of the present disclosure. It should be pointed out that for those skilled in the art, the present disclosure may be improved and modified without departing from the principle of the present disclosure, and these improvements and modifications shall also fall within the scope of protection of the claims of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A rotating assembly, comprising: a rotary shaft (1), an accommodating body (2) and a position-limiting switch (3), wherein
an outer wall of the rotary shaft (1) is provided with a first tenon (11) and a second tenon (12);
the accommodating body (2) is provided with a matching hole (21) for the first tenon (11) to insert and rotate therein, an inner wall of the matching hole (21) is provided with a convex rib (22), and by rotating the rotary shaft (1), a side wall of the first tenon (11) and a side wall of the convex rib (22) butt against or separate from each other, so that in an axial direction of the rotary shaft (1), the rotary shaft (1) is fixed or movable relative to the accommodating body (2); and
when the side wall of the first tenon (11) and the side wall of the convex rib (22) butt against each other, the position-limiting switch (3) and the second tenon (12) are clamped together to prevent the rotary shaft (1) form rotating relative to the accommodating body (2).

2. The rotating assembly according to claim 1, wherein the inner wall of the matching hole (21) is also provided with a positioning rib (23), the positioning rib (23) and the convex rib (22) are spaced from each other in a circumferential direction of the matching hole (21), and a width of the positioning rib (23) along the axial direction of the matching hole (21) is greater than a width of the convex rib (22) along the axial direction of the matching hole (21); and
when the first tenon (11) is rotated a position between the positioning rib (23) and the convex rib (22), an end face of the positioning rib (23) butt against an end face of the first tenon (11), and the end face of the positioning rib (23) and the end face of the first tenon (11) are separated from each other by controlling the first tenon (11) to move along an axis of the rotary shaft (1) and in a direction of approaching the position-limiting switch (3).

3. The rotating assembly according to claim 2, wherein the inner wall of the matching hole (21) is also provided with a connecting rib (24), the connecting rib (24) is connected with the positioning rib (23), two ends of the convex rib (22) are respectively spaced from ends of the connecting rib (24) and the positioning rib (23), a width of the connecting rib (24) along the axial direction of the matching hole (21) is equal to a width of the convex rib (22) along the axial direction of the matching hole (21), and two first tenons (11) are provided in a same circumferential direction of the rotary shaft (1);
when the side wall of one of the first tenons (11) butts against the side wall of the convex rib (22), the side wall of the other of the first tenons (11) butts against the side wall of the connecting rib (24), and the position-limiting switch (3) and the second tenon (12) are clamped together; and
when the position-limiting switch (3) is separated from the second tenon (12), and the rotary shaft (1) rotates to a position where an end face of one of the first tenon (11) and an end face of the positioning rib (23) butt against each other, the other of the first tenons (11) is located between the connecting rib (24) and the convex rib (22).

4. The rotating assembly according to claim 1, wherein the position-limiting switch (3) can move to be close to or far away from the second tenon (12) in a radial direction of the rotary shaft (1) to achieve the clamping to and loosening from the second tenon (12).

5. The rotating assembly according to claim 4, wherein the position-limiting switch (3) comprises a clamping arm (31), which has a clamping opening (32) for clamping the second tenon (12) and clamping a side wall of the rotary shaft (1).

6. A handle, comprising: two gripping portions (80), and a body portion (90) located between the two gripping portions (80), wherein the handle further comprises the rotating assembly according to claim 5; and
one of the body portion (90) and the gripping portion (80) is provided with the rotary shaft (1), and the other of the body portion (90) and the gripping portion (80) is provided with the accommodating body (2) and the position-limiting switch (3).

7. The rotating assembly according to claim 4, wherein it further comprises an elastic member (4) butting against the position-limiting switch (3), so that the position-limiting switch (3) is subjected to a preload force for moving in a direction of approaching the second tenon (12).

8. A handle, comprising: two gripping portions (80), and a body portion (90) located between the two gripping portions (80), wherein the handle further comprises the rotating assembly according to claim 7; and
one of the body portion (90) and the gripping portion (80) is provided with the rotary shaft (1), and the other of the body portion (90) and the gripping portion (80) is provided with the accommodating body (2) and the position-limiting switch (3).

9. A handle, comprising: two gripping portions (80), and a body portion (90) located between the two gripping portions (80), wherein the handle further comprises the rotating assembly according to claim 4; and
one of the body portion (90) and the gripping portion (80) is provided with the rotary shaft (1), and the other of the body portion (90) and the gripping portion (80) is provided with the accommodating body (2) and the position-limiting switch (3).

10. The rotating assembly according to claim 3, wherein the position-limiting switch (3) can move to be close to or far away from the second tenon (12) in a radial direction of the rotary shaft (1) to achieve the clamping to and loosening from the second tenon (12).

11. A handle, comprising: two gripping portions (80), and a body portion (90) located between the two gripping portions (80), wherein the handle further comprises the rotating assembly according to claim 3; and
one of the body portion (90) and the gripping portion (80) is provided with the rotary shaft (1), and the other of the body portion (90) and the gripping portion (80) is provided with the accommodating body (2) and the position-limiting switch (3).

12. The rotating assembly according to claim 2, wherein the position-limiting switch (3) can move to be close to or far away from the second tenon (12) in a radial direction of the rotary shaft (1) to achieve the clamping to and loosening from the second tenon (12).

13. A handle, comprising: two gripping portions (80), and a body portion (90) located between the two gripping portions (80), wherein the handle further comprises the rotating assembly according to claim 2; and one of the body portion (90) and the gripping portion (80) is provided with the rotary shaft (1), and the other of the body portion (90) and the gripping portion (80) is provided with the accommodating body (2) and the position-limiting switch (3).

14. The rotating assembly according to claim 1, wherein the matching hole (21) is provided thereon with a plurality of the convex ribs (22) that are spaced at an interval in an axial direction of the matching hole (21), the rotary shaft (1) is provided thereon with a plurality of the first tenons (11) in the axial direction of the rotary shaft (1), a quantity of the first tenons is the same as a quantity of the convex ribs (22), and all the first tenons (11) are used to simultaneously butt against or separate from different convex ribs (22).

15. The rotating assembly according to claim 14, wherein the position-limiting switch (3) can move to be close to or far away from the second tenon (12) in a radial direction of the rotary shaft (1) to achieve the clamping to and loosening from the second tenon (12).

16. A handle, comprising: two gripping portions (80), and a body portion (90) located between the two gripping portions (80), wherein the handle further comprises the rotating assembly according to claim 14; and one of the body portion (90) and the gripping portion (80) is provided with the rotary shaft (1), and the other of the body portion (90) and the gripping portion (80) is provided with the accommodating body (2) and the position-limiting switch (3).

17. A handle, comprising: two gripping portions (80), and a body portion (90) located between the two gripping portions (80), wherein the handle further comprises the rotating assembly according to claim 1; and one of the body portion (90) and the gripping portion (80) is provided with the rotary shaft (1), and the other of the body portion (90) and the gripping portion (80) is provided with the accommodating body (2) and the position-limiting switch (3).

18. The handle according to claim 17, wherein two sides of the body portion (90) are respectively provided with a control key (5) and a screen (6).

19. The handle according to claim 18, wherein the position-limiting switch (3) is provided with a contact (33), the two gripping portions (80) are provided with the rotary shaft (1), and the body portion (90) is provided with a position-limiting hole (911) for the contact (33) to extend out and move therein, and the position-limiting switch (3) and the second tenon (12) are separated from each other by touching the contact (33) to control the contact (33) to move in a direction away from the rotary shaft (1).

20. The handle according to claim 17, wherein the position-limiting switch (3) is provided with a contact (33), the two gripping portions (80) are provided with the rotary shaft (1), and the body portion (90) is provided with a position-limiting hole (911) for the contact (33) to extend out and move therein, and the position-limiting switch (3) and the second tenon (12) are separated from each other by touching the contact (33) to control the contact (33) to move in a direction away from the rotary shaft (1).

\* \* \* \* \*